United States Patent
Fu et al.

(10) Patent No.: US 9,527,661 B2
(45) Date of Patent: *Dec. 27, 2016

(54) DISPOSABLE SINGLE USE BEVERAGE PACKAGE

(75) Inventors: Thomas Z. Fu, Naperville, IL (US); Matthew R. Cook, Oak Brook, IL (US)

(73) Assignee: LBP MANUFACTURING LLC, Cicero, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/889,144

(22) Filed: Sep. 23, 2010

(65) Prior Publication Data

US 2011/0073607 A1    Mar. 31, 2011

Related U.S. Application Data

(60) Provisional application No. 61/246,796, filed on Sep. 29, 2009.

(51) Int. Cl.
*A47G 19/22* (2006.01)
*B65D 85/804* (2006.01)
*B65D 65/46* (2006.01)

(52) U.S. Cl.
CPC ......... *B65D 85/8043* (2013.01); *B65D 65/466* (2013.01); *Y02W 90/13* (2015.05); *Y02W 90/14* (2015.05)

(58) Field of Classification Search
CPC ...... B65D 85/8043; A47J 31/08; A47J 31/368
USPC ....... 426/77–78, 82, 86, 106, 112, 113, 115; 206/0.5; 99/295; 220/703, 711
See application file for complete search history.

(56) References Cited

U.S. PATENT DOCUMENTS

| | | | |
|---|---|---|---|
| 2,224,378 A | | 12/1940 | Coniglio |
| 2,224,409 A | | 12/1940 | Schleyer |
| 2,743,664 A | * | 5/1956 | Dale ............................. 99/295 |
| 2,885,290 A | | 5/1959 | Krasker |
| 2,968,560 A | | 1/1961 | Goros |
| 3,483,812 A | | 12/1969 | Gast |
| 3,592,126 A | | 7/1971 | Dombrowik |
| 3,811,373 A | | 5/1974 | Telco |
| 3,935,112 A | | 1/1976 | Greutert |

(Continued)

FOREIGN PATENT DOCUMENTS

| | | |
|---|---|---|
| CA | 2010954 | 8/1991 |
| CA | 2727099 | 9/2005 |

(Continued)

OTHER PUBLICATIONS

Definitions of "bonded", "bond" from dictionary.com, printed Jul. 10, 2014.*

(Continued)

*Primary Examiner* — Jianying Atkisson
(74) *Attorney, Agent, or Firm* — Dinsmore & Shohl LLP (57) ABSTRACT

A disposable single use beverage package is disclosed. The package may include an impermeable barrier surrounding a permeable single walled basket. The permeable basket may include a frame and a filter. The permeable basket may also include a lid. The permeable basket may be provided preloaded with beverage grounds or may be loaded with beverage grounds during use. The beverage packet may be manufactured of materials that are biodegradable, compostable, or otherwise environmentally friendly.

15 Claims, 7 Drawing Sheets

(56) References Cited

U.S. PATENT DOCUMENTS

| | | | | |
|---|---|---|---|---|
| 4,052,318 | A | 10/1977 | Krebs | |
| 4,130,622 | A | 12/1978 | Pawlak | |
| 4,271,024 | A | 6/1981 | Kawolics et al. | |
| 4,382,861 | A * | 5/1983 | Adeboi et al. | 210/497.2 |
| D270,513 | S | 9/1983 | Wallsten | |
| 4,471,689 | A | 9/1984 | Piana | |
| 4,522,298 | A | 6/1985 | Weinberger | |
| 4,626,435 | A | 12/1986 | Zimmerman | |
| 4,756,915 | A * | 7/1988 | Dobry | 426/234 |
| 4,832,845 | A | 5/1989 | Hendretti | |
| 4,859,337 | A | 8/1989 | Woltermann | |
| 4,882,055 | A * | 11/1989 | Stamstad | B01D 29/111 210/483 |
| 4,886,674 | A | 12/1989 | Seward | |
| 5,011,023 | A * | 4/1991 | Arai | 209/400 |
| 5,012,629 | A | 5/1991 | Rehman | |
| 5,082,676 | A | 1/1992 | Love | |
| 5,108,768 | A | 4/1992 | So | |
| 5,125,327 | A * | 6/1992 | Winnington-Ingram | 99/306 |
| 5,197,374 | A | 3/1993 | Fond | |
| 5,207,341 | A | 5/1993 | Yeager | |
| 5,243,164 | A | 9/1993 | Erickson | |
| 5,266,194 | A | 11/1993 | Chiodo | |
| 5,277,103 | A | 1/1994 | Cox | |
| 5,298,267 | A | 3/1994 | Gruenbacher | |
| 5,325,765 | A | 7/1994 | Sylvan et al. | |
| D349,211 | S | 8/1994 | Cerato | |
| 5,347,916 | A | 9/1994 | Fond | |
| 5,424,083 | A | 6/1995 | Lozito | |
| 5,520,093 | A | 5/1996 | Ackermann | |
| 5,605,710 | A | 2/1997 | Pridonoff | |
| 5,633,026 | A * | 5/1997 | Gruenbacher | 426/77 |
| 5,637,335 | A | 6/1997 | Fond | |
| 5,738,786 | A * | 4/1998 | Winnington-Ingram | 210/474 |
| 5,758,473 | A | 6/1998 | Patelli | |
| 5,776,527 | A | 7/1998 | Blanc | |
| 5,840,189 | A | 11/1998 | Sylvan et al. | |
| D408,679 | S | 4/1999 | Britt | |
| 5,895,672 | A | 4/1999 | Cooper | |
| 5,948,455 | A | 9/1999 | Schaeffer | |
| 5,967,019 | A | 10/1999 | Johnson | |
| 6,076,450 | A | 6/2000 | Digiorgio, Jr. | |
| 6,079,315 | A | 6/2000 | Beaulieu et al. | |
| 6,082,247 | A | 7/2000 | Beaulieu | |
| 6,142,063 | A | 11/2000 | Beaulieu | |
| 6,182,554 | B1 | 2/2001 | Beaulieu et al. | |
| 6,283,013 | B1 | 9/2001 | Romandy | |
| D452,433 | S | 12/2001 | Lazaris | |
| D452,434 | S | 12/2001 | Sweeney | |
| 6,440,256 | B1 | 8/2002 | Gordon et al. | |
| D462,865 | S | 9/2002 | Honan | |
| 6,485,766 | B2 | 11/2002 | Herod | |
| 6,517,880 | B2 * | 2/2003 | Walters et al. | 426/433 |
| D474,110 | S | 5/2003 | Sweeney | |
| D474,111 | S | 5/2003 | Lazaris | |
| 6,589,577 | B2 | 7/2003 | Lazaris et al. | |
| 6,606,938 | B2 | 8/2003 | Taylor | |
| 6,607,762 | B2 | 8/2003 | Lazaris et al. | |
| 6,644,173 | B2 | 11/2003 | Lazaris et al. | |
| 6,645,537 | B2 | 11/2003 | Sweeney et al. | |
| 6,655,260 | B2 | 12/2003 | Lazaris et al. | |
| 6,658,989 | B2 | 12/2003 | Sweeney et al. | |
| 6,662,955 | B1 | 12/2003 | Lassota | |
| 6,666,130 | B2 | 12/2003 | Taylor et al. | |
| 6,672,200 | B2 | 1/2004 | Duffy | |
| 6,708,600 | B2 | 3/2004 | Winkler et al. | |
| D489,215 | S | 5/2004 | Honan | |
| 6,740,345 | B2 | 5/2004 | Cai | |
| 6,758,130 | B2 | 7/2004 | Sargent | |
| D494,811 | S | 8/2004 | Rossi | |
| 6,777,007 | B2 | 8/2004 | Cai | |
| 6,786,134 | B2 | 9/2004 | Green | |
| 6,810,788 | B2 | 11/2004 | Hale | |
| 6,844,015 | B2 * | 1/2005 | Yuguchi | 426/78 |
| D502,362 | S | 3/2005 | Lazaris et al. | |
| 6,861,086 | B2 | 3/2005 | Buckingham | |
| 6,948,420 | B2 | 9/2005 | Kirschner | |
| D513,572 | S | 1/2006 | Schaffeld | |
| 7,081,263 | B2 * | 7/2006 | Albrecht | 426/82 |
| 7,165,488 | B2 | 1/2007 | Bragg et al. | |
| 7,213,506 | B2 | 5/2007 | Halliday | |
| D544,299 | S | 6/2007 | Schaffeld | |
| 7,311,037 | B2 | 12/2007 | Albrecht | |
| D564,832 | S * | 3/2008 | Bodum | D7/400 |
| 7,347,138 | B2 | 3/2008 | Bragg et al. | |
| 7,360,418 | B2 | 4/2008 | Pelovitz | |
| 7,377,162 | B2 | 5/2008 | Lazaris | |
| 7,398,726 | B2 | 7/2008 | Streeter | |
| 7,412,921 | B2 | 8/2008 | Hu | |
| 7,490,542 | B2 | 2/2009 | Macchi | |
| 7,513,192 | B2 | 4/2009 | Sullivan et al. | |
| 7,523,695 | B2 | 4/2009 | Streeter | |
| 7,543,527 | B2 | 6/2009 | Schmed | |
| 7,552,672 | B2 | 6/2009 | Schmed | |
| 7,624,673 | B2 | 12/2009 | Zanetti | |
| 7,640,845 | B2 | 1/2010 | Woodnorth | |
| 7,836,819 | B2 | 11/2010 | Suggi Liverani | |
| D637,484 | S | 5/2011 | Winkler | |
| 8,039,029 | B2 | 10/2011 | Ozanne | |
| 8,039,034 | B2 | 10/2011 | Ozanne | |
| 8,221,813 | B2 * | 7/2012 | Boul | 426/433 |
| 2002/0144603 | A1 | 10/2002 | Taylor | |
| 2004/0045443 | A1 | 3/2004 | Lazaris et al. | |
| 2004/0115317 | A1 * | 6/2004 | Doglioni | 426/123 |
| 2004/0118295 | A1 | 6/2004 | Angeles | |
| 2004/0149135 | A1 | 8/2004 | Cai | |
| 2004/0159075 | A1 | 8/2004 | Matthews | |
| 2004/0182250 | A1 * | 9/2004 | Halliday et al. | 99/279 |
| 2005/0051478 | A1 | 3/2005 | Karanikos et al. | |
| 2005/0056153 | A1 | 3/2005 | Nottingham et al. | |
| 2005/0205601 | A1 | 9/2005 | Taylor | |
| 2005/0266122 | A1 | 12/2005 | Franceschi | |
| 2005/0287251 | A1 * | 12/2005 | Lazaris et al. | 426/106 |
| 2006/0021930 | A1 | 2/2006 | Cai et al. | |
| 2006/0057257 | A1 | 3/2006 | Ma | |
| 2006/0099393 | A1 | 5/2006 | Woodman et al. | |
| 2006/0169149 | A1 | 8/2006 | Voss | |
| 2006/0174773 | A1 | 8/2006 | Taylor | |
| 2006/0230944 | A1 | 10/2006 | Neace et al. | |
| 2006/0236871 | A1 | 10/2006 | Ternite | |
| 2006/0292012 | A1 | 12/2006 | Brudevold | |
| 2007/0000390 | A1 | 1/2007 | Albrecht | |
| 2007/0056994 | A1 | 3/2007 | Woodnorth et al. | |
| 2007/0089614 | A1 | 4/2007 | Tremblay | |
| 2007/0125238 | A1 * | 6/2007 | Urquhart et al. | 99/275 |
| 2007/0221066 | A1 | 9/2007 | Sullivan et al. | |
| 2008/0060751 | A1 | 3/2008 | Arrindell | |
| 2008/0095904 | A1 | 4/2008 | Sullivan et al. | |
| 2008/0115674 | A1 | 5/2008 | Huang et al. | |
| 2008/0134902 | A1 | 6/2008 | Zimmerman et al. | |
| 2008/0251518 | A1 | 10/2008 | Tee | |
| 2008/0264267 | A1 | 10/2008 | Doglioni | |
| 2009/0007792 | A1 | 1/2009 | Glucksman et al. | |
| 2009/0056557 | A1 * | 3/2009 | Lin | 99/323 |
| 2009/0173043 | A1 | 7/2009 | Bloome | |
| 2009/0229470 | A1 | 9/2009 | Dorfmueller | |
| 2009/0260521 | A1 * | 10/2009 | Tatsuno | 99/279 |
| 2010/0024658 | A1 | 2/2010 | Jacobs | |
| 2010/0028495 | A1 | 2/2010 | Novak | |
| 2010/0043644 | A1 | 2/2010 | Suggi Liverani | |
| 2010/0043645 | A1 | 2/2010 | Suggi Liverani | |
| 2010/0043646 | A1 | 2/2010 | Suggi Liverani | |
| 2010/0077928 | A1 | 4/2010 | Schmed | |
| 2010/0093245 | A1 | 4/2010 | Bradley et al. | |
| 2010/0282091 | A1 | 11/2010 | Doleac | |
| 2010/0288131 | A1 * | 11/2010 | Kilber | B65D 85/8043 99/295 |
| 2010/0288133 | A1 | 11/2010 | Litzka | |
| 2010/0303964 | A1 | 12/2010 | Beaulieu | |
| 2010/0320206 | A1 | 12/2010 | Caldwell | |
| 2011/0030563 | A9 | 2/2011 | Doglioni | |
| 2011/0064852 | A1 | 3/2011 | Mann | |
| 2011/0070384 | A1 | 3/2011 | Bentley | |
| 2011/0070385 | A1 | 3/2011 | Jahani | |

(56) References Cited

U.S. PATENT DOCUMENTS

| | | |
|---|---|---|
| 2011/0073607 A1 | 3/2011 | Fu et al. |
| 2011/0076361 A1 | 3/2011 | Peterson |
| 2011/0127319 A1 | 6/2011 | Golden |
| 2011/0142996 A1 | 6/2011 | Kruger |
| 2011/0151075 A1 | 6/2011 | Peterson |
| 2011/0168029 A1 | 7/2011 | Fulco |
| 2011/0183043 A1 | 7/2011 | Reati |
| 2011/0185911 A1 | 8/2011 | Rapparini |
| 2011/0226343 A1 | 9/2011 | Novak |
| 2012/0058226 A1 | 3/2012 | Winkler |

FOREIGN PATENT DOCUMENTS

| | | | |
|---|---|---|---|
| CN | 2425039 | | 3/2001 |
| CN | 2727099 Y | | 9/2005 |
| FR | 2213757 | | 8/1974 |
| GB | 1348370 | | 3/1974 |
| JP | S56-000664 U1 | | 1/1981 |
| JP | U1987-163040 | | 1/1989 |
| JP | 06113952 A | * | 4/1994 |
| JP | 08244836 A | * | 9/1996 |
| JP | H09-000451 A | | 1/1997 |
| JP | 2004500199 | | 1/2004 |
| JP | 3141054 U | * | 4/2008 |
| JP | 2009011420 A | | 1/2009 |
| WO | WO 9307791 A1 | * | 4/1993 |
| WO | WO0160712 | | 8/2001 |
| WO | WO2005026018 | | 3/2005 |
| WO | 2008029265 A2 | | 3/2008 |
| WO | WO2009006374 | | 1/2009 |

OTHER PUBLICATIONS

International Search Report and Written Opinion of the International Searching Authority mailed Nov. 19, 2010, for corresponding International Application No. PCT/US2010/050505.
Office Action for corresponding Singapore application 201202280-2, mailed Mar. 6, 2013.
International Search Report and Written Opinion of the International Searching Authority for PCT/US2012/47835, mailed Jan. 8, 2013.
Plastic coffee ground basket with metal mesh, and holder for same, for Breville Brewer, product available prior to earliest application filing date.
International Search Report and Written Opinion for PCT/US2012/55910, mailed Dec. 11, 2012.
Official Action, dated Sep. 16, 2014, for corresponding Japanese Application No. 2012-532233 (7 pages).
Official Communication issued in corresponding EP Appln. No. 12833059.4, dated Jun. 24, 2016.
First, Second and Third Official Actions by the Canadian IPO, dated Feb. 11, 2013, Jul. 23, 2014, and Oct. 8, 2014, respectively, for related pending Canadian Patent Appln. No. 2776150 (8 pages).
Official Action issued in related U.S. Appl. No. 14/534,871, mailed Apr. 7, 2016.
My K-Cup: Keurig Single-Cup Coffee Headquarters—Coffee, Brewers and Accessories, Jul. 26, 2006, retrieved by Canadian Patent Examiner on Jan. 5, 2014 from www.mykcup.com (2 pates).
Official Action issued in related U.S. Appl. No. 14/716,592, mailed Aug. 17, 2015.
Official Action issued in related U.S. Appl. No. 14/716,592, mailed Nov. 17, 2015.
Advisory Action issued in related U.S Appl. No. 14/716,592, mailed Feb. 24, 2016.
Official Action issued in related U.S. Appl. No. 14/716,592, mailed Apr. 7, 2016.
Official Action issued in related U.S. Appl. No. 14/716,592, mailed Aug. 23, 2016.
Official Action (English translation not available) issued in corresponding Chinese Appln. No. 201280052073.4, dated Jul. 17, 2015 (12 pages).
Official Action issued in U.S. Appl. No. 13/624,169, mailed Jan. 15, 2016.
Official Action issued in U.S. Appl. No. 13/624,169, mailed Jun. 10, 2015.

* cited by examiner

DISPOSABLE SINGLE USE BEVERAGE PACKAGE

RELATED APPLICATIONS

This application claims the benefit of the filing date under 35 U.S.C. §119 to U.S. Provisional Application No. 61/246,796, filed Sep. 29, 2009, the contents of which are hereby incorporated by reference in their entirety.

BACKGROUND

Single serve beverage brewing is popular among consumers. There are many formats of single serve brewers on the market. These brewers are designed to quickly brew a single cup of coffee or tea. The coffee or tea grounds are sold in prepared, single serving portions.

Reusable devices for single serve brewers, such as devices with metal or steal filters, may not suitable in some situations. For example, when efficiency is required such as in a busy home, in an office environment, or in a waiting-room environment. Reusable devices require cleaning, which may be complicated by the tendency of beverage grounds to cake into the filter openings. Additionally, to accommodate cleaning of reusable devices, the single serve brewer will be required to be placed near a source of water and a sink or drain. Provision of a sink or drain may be impracticable.

BRIEF SUMMARY

A disposable single use beverage package. The package may include a barrier, which may be an impermeable barrier surrounding a basket, which may be a permeable single walled basket. The basket may include a frame and a filter medium. The basket may also include a lid. The basket may be provided preloaded with beverage grounds or may be loaded with beverage grounds during use.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION OF THE DRAWINGS

Single serve beverage brewing is popular among consumers due to the convenience and flexibility that it provides. Many single serve beverage brewers have entered the market. Traditional brewers typically produce between four and twenty cups of beverage at a time. The beverage sits on a hot plate until it is consumed. As time passes, the taste of the beverage may decline. Single serve brewing allows a consumer to enjoy beverages, such as coffee and tea, in an efficient fashion and without a decline in the taste profile of the beverage.

Figure 1:
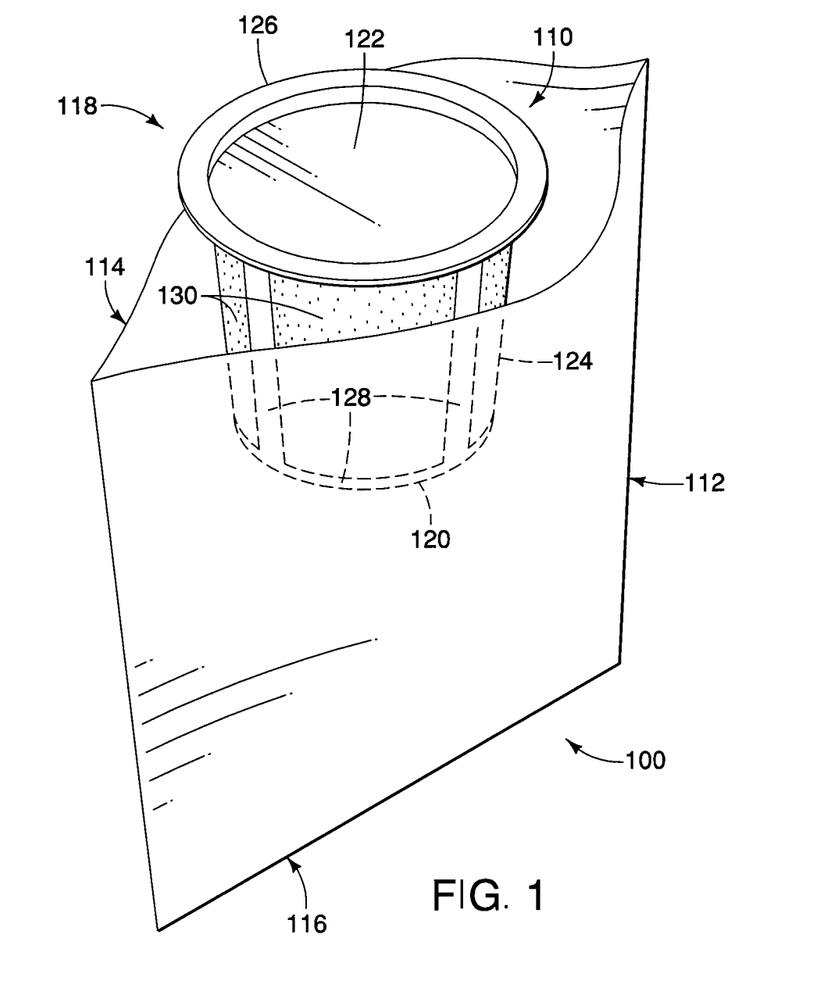
FIG. 1 illustrates a disposable beverage portion basket with packaging.

In FIG. 1, coffee or tea grounds for use in a single serving brewer may be packaged in a disposable single use beverage package 100. A disposable single use beverage package 100 may include a basket 110, which may be a permeable basket and barrier 112, which may be a disposable impermeable barrier.

The barrier 112 may have a first side 114 and a second side 116. The first side 114 may include a score, a tab, a zip, an embedded string, or otherwise provide a means for assisting a user to open the barrier 112. The barrier 112 may be sealed at the second side 116 or other sides by gusseting, pinching, heat sealing, stapling, or otherwise. Alternatively or additionally, the barrier 112 may be a shrink wrap barrier or a wax barrier, among others.

The barrier 112 may be substantially resistant to the passage of liquids, gases, and solids. For example, the barrier 112 may be hermetically sealed to block moisture and oxygen from entering the pouch and to retain the aroma of the coffee. Additionally or alternatively, several baskets may be prefilled and packaged together in an egg crate type configuration, a tube, or other packaging, to maintain freshness during shipping and storing. The barrier 112 may be made of materials such as foil laminate, metalized films, EVOH films, polyolefin based material, parafilm, plastics, and combinations of these, among others.

A user may open the package 100, for example, by tearing the barrier 112 along the first side 114 to reveal the basket 110. The user may remove the basket 110 from the barrier 112 and place the basket 110 into a single serve brewer. The basket 110 may be prefilled with grounds, or alternatively, the user may add grounds to the basket 110.

The basket 110 may be a single-wall permeable basket including a first end 118, which may be reversibly closed or an open end, and a second end 120, which may be a closed end. The basket 110 may be a cup shaped basket and may be used with a lid 122. The basket 110 may also have a side wall 124 and a rim 126. The side wall 124 may connect the second end 120 and the rim 126. The side wall 124 may include a frame 128 and a filter medium 130.

The frame 128 may provide structure, stability, and integrity to the filter medium 130. The frame 128 may be formed by injection molding or by a different process suitable for manufacturing a rigid form around a relatively flexible filter medium. The frame 128 may be made of any one of many commercially available materials, such as polystyrene, polyethylene, polypropylene, polyester, polyamide or Nylon, or other synthetic or natural plastics or combinations thereof. The frame may be made from other materials such as a bio-based polymer, such as polylaticacid (PLA), poly hydroxybutaric acid (PHA) or a starch based polymer. The frame 128 may be made of other materials known to those skilled in the art.

Figure 2:
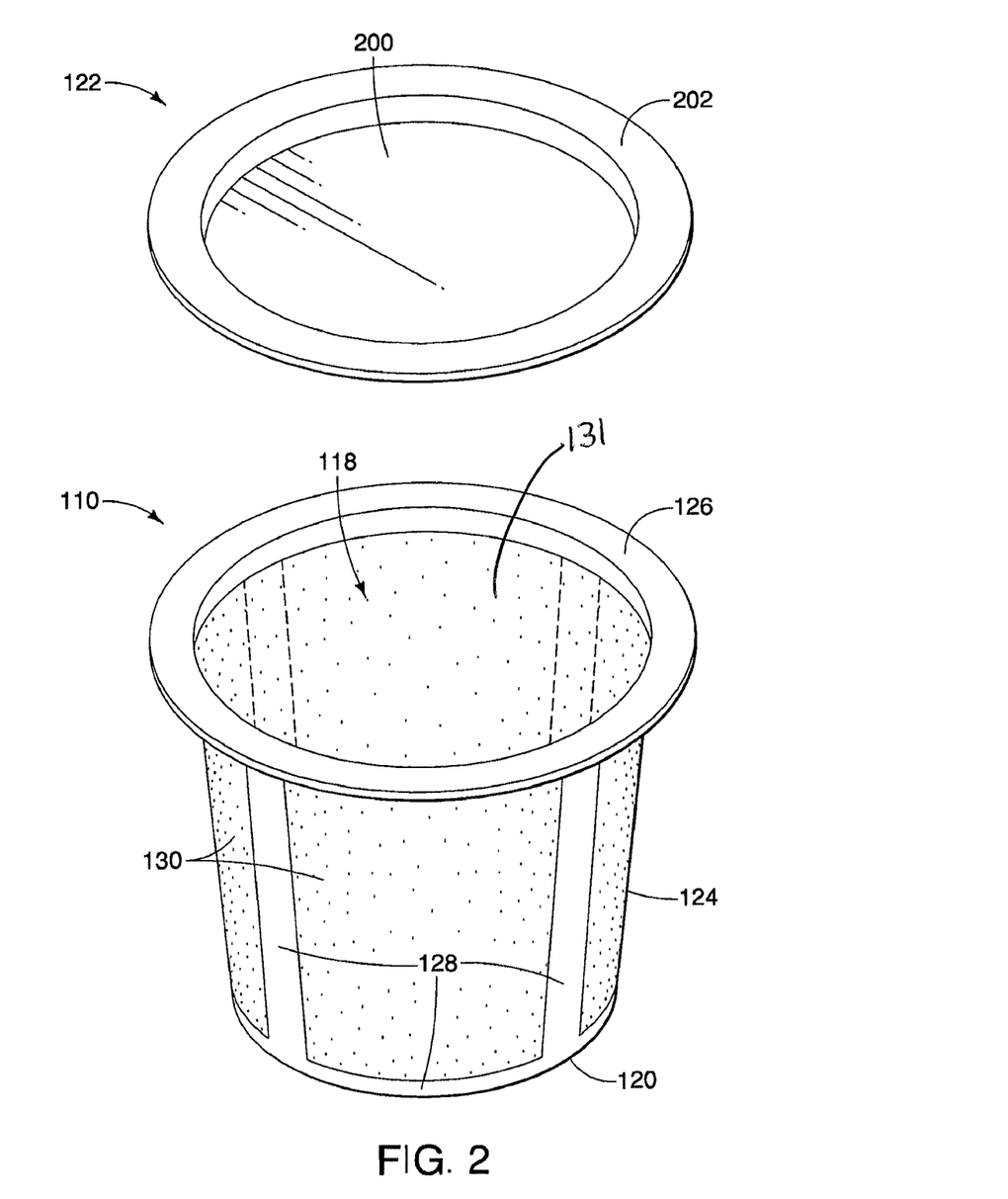
FIG. 2 illustrates a disposable beverage portion basket and lid.
Figure 7A:
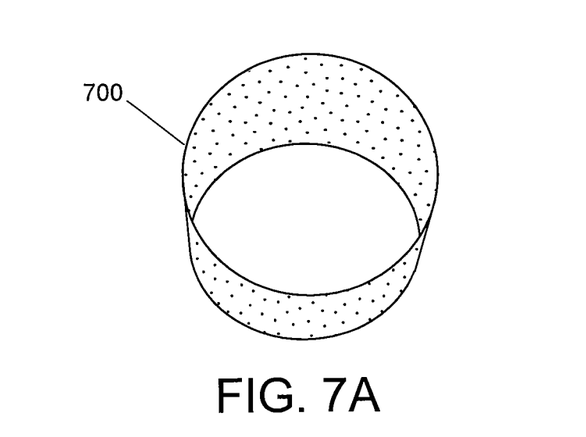
FIG. 7A illustrates an exemplary filter medium side portion configured to be molded into a basket.
Figure 7B:
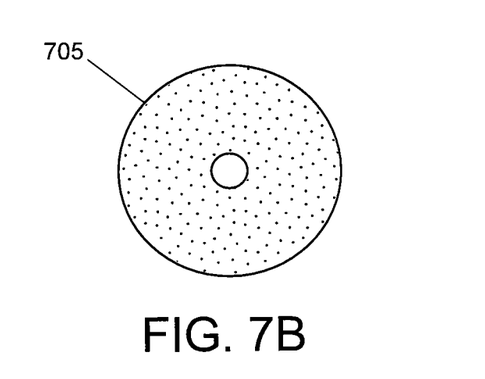
FIG. 7B illustrates an exemplary filter medium bottom portion, if needed, configured to be molded to a bottom surface of a frame of a basket.
Figure 7C:
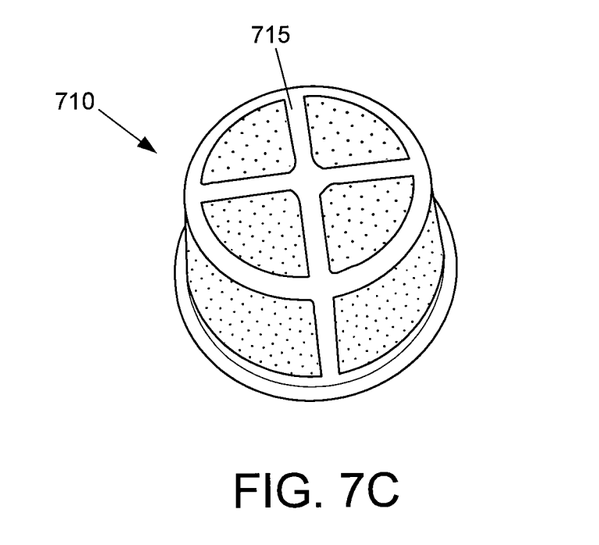
FIG. 7C illustrates an exemplary filter side portion and filter bottom portion molded to a basket.

In FIG. 2, the side walls 124 of the basket 110 may be defined by the frame 128 and a filter medium 130. The filter medium 130 may be secured to the basket 110, for example, at the second end 120, the rim 126, and/or at that frame 128. The filter medium 130 may be secured for example, by thermal bonding of the plastic used for the frame 128, or with an adhesive, by crimping, by heat sealing, or any other way. The filter medium 130 may be secured in the frame 128 in insert-injection molding of the plastic frame around a filter medium insert. For example, a pre-die cut blank of filter medium may be placed on a mandrel which has channels around the shape of the pre die-cut blank. Molten plastic may flow in and bond to the blank of the filter medium 130 during inert-injection molding. The plastic may solidify into the frame 128, for example, upon cooling. Referring to FIGS. 7A-7C, in an alternative embodiment the filter medium 700 and 705 may be first formed into a generally cylindrical and tapered portion 700 and an optional bottom circular filter medium 705 herein after referred to as the circular portion 705. The filter medium 700 and 705 may then be placed or inserted onto a mold for insert injection molding to form the basket 710 with the filter media 700 and 705 supported by the frame of the basket 710. The bottom end 715 of the frame of the basket 710 may be substantially open and a circular filter portion 705 may cover the open portions.

The filter medium 130 may be a porous material and may be permeable to liquids and some oils. It may be formed of many materials, for example, non-woven materials such as polystyrene, polyethylene, polypropylene, polylactic acid, cellulosic fibers, polyhydroxyalkanoates, thermoplastic starch, filter paper, other paper materials, polymer materials, a combination of these or any other material. The filter medium 130 may also be formed from a polymer or plastic filtration mesh, or microporous or apertured films made of various plastic materials, such as polypropylene, Nylon 6 and high density polyethylene or other materials known to those skilled in the art. Alternatively, the filter medium 130 may be formed from a bio-based polymer, such as polylatic acid (PLA), poly hydroxybutaric acid (PHA) or starch based polymer.

Characteristics of the filter medium 130 may be selected to meet the filtration needs of different products, such as ground coffee, tea powders or leaves, or other brewed products. For example, the basis weight, thickness, strand count, mesh size, flow rate and strength of the filter medium 130 may be selected based on the product to be brewed.

The filter medium 130 may be compostable, biodegradable, recycled, and/or recyclable. If the filter medium 130 is a non-woven material formed of fibers (represented by element 131), it may have a greater resistance than, for example, a woven material or a metal filter. A non-woven filter medium 130 may retain water in the basket for longer than, for example, a woven or metal filter. The length of time that the water is retained in the basket with the grounds may influence the strength and therefore the taste profile of the resulting beverage. This may be because a woven material or a metal material may have technological limitations on the size of the openings there through. A non-woven material may not have the same technological limitations. Therefore, the difference may be that, in a woven material or metal material, the path of the water may be straight through the wall and in the non-woven material, the path may be indirect and convoluted.

The basket 110 may include a lid 122. The lid 122 may include a rim 202 and a cover 200. The cover 200 may be disposed below the rim 202 for secure fitting with the basket 110. Alternatively, the cover 200 may not include a rim 202. The cover 200 may be made from a material that may be punctured to allow a liquid to enter into the basket. For example, the cover 200 may be a material, such as a foil, film, coated film, or multilayer laminate, which is sealed to or across the rim 126 of the permeable basket 110 to maintain contents therein. The cover 200 may keep dry contents dry, wet contents wet, and may maintain a freshness of the contents. The cover 200 may be formed of a plastic, metallic foil, filter material, thermoplastic starch, or a laminate or composite thereof.

Figure 3:
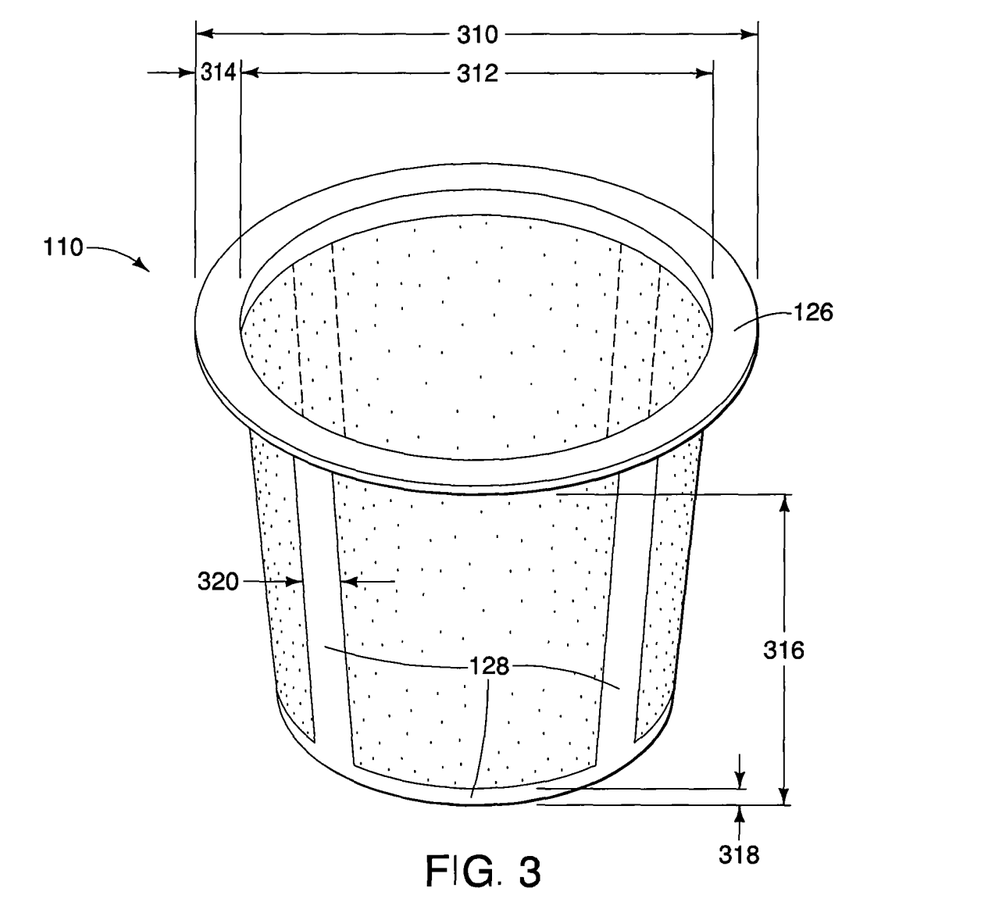
FIG. 3 illustrates a disposable beverage portion basket with exemplary dimensions.

The basket 110 may be dimensioned for use with a commercial single serve coffee brewer. FIG. 3 shows an exemplary basket 110. The basket 110 may have width of the open end 312, and a height 316. The open end 312 may be, for example but not limited to, about 38-42 mm. The height 316 may be, for example but not limited to, 38-42 mm. The rim 126 may have a dimension 314 of, for example but not limited to, 3.5-5.5 mm. The frame 128 may have a dimension 320 of, for example but not limited to, 5 mm, and a dimension 318 of, for example but not limited to 2 mm. These dimensions are merely exemplary and not limiting. The basket 110 may also have other dimensions or shapes, for example, dimensions that permit use in various single serve beverage machines.

Figure 4:
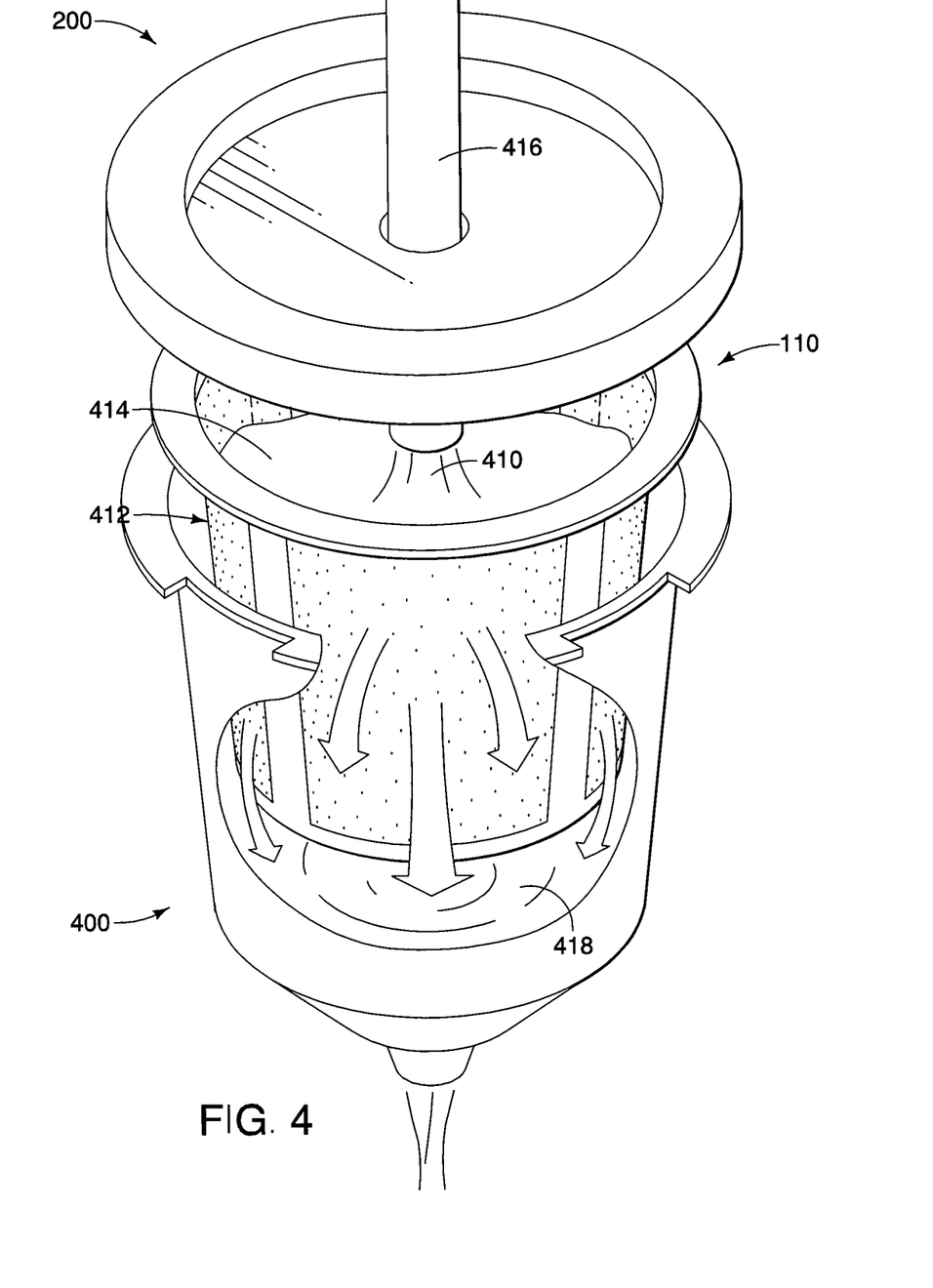
FIG. 4 illustrates use of a disposable beverage portion basket.

In FIG. 4, a basket 110 may be prefilled with beverage grounds 414, for example but not limited to, coffee or tea grounds. Alternatively or additionally, the basket 110 may be loaded with beverage grounds 414 immediately prior to use. If the basket 110 is prefilled with beverage grounds 414 it may be sealed with a lid 122. Alternatively, if the permeable basket 110 is not preloaded with beverage grounds 414, it may not have a lid 122, additionally or alternatively; it may have a removable lid 122, or otherwise.

During use, a user may open the barrier 112, take out the basket 110 and place the basket 110 into a single serve beverage machine. A heated liquid 410 may be received by the basket 110 through an opening in the cover 200 or otherwise. For example, during use, a preloaded basket 110 may be placed inside a cartridge 400 for a single serve beverage machine. The cartridge 400 may be reusable or disposable. During a brewing cycle, the cover 200 may be pierced by a probe 416 to admit heated liquid 410 into the basket 110. The heated liquid may interact with the beverage grounds 414 creating a beverage medium. The beverage medium 418 may flow through the filter medium 130 and exit through an opening in the cartridge 400.

As a second example, during use, an unloaded permeable basket 110 may be placed inside a cartridge 400 for a single serve beverage machine. The cartridge 400 may be reusable or disposable. The beverage grounds 414 may be placed into the basket 110. A cover 200 may be attached to maintain the contents of the basket 110. During a brewing cycle, the cover 200 may be pierced by a probe 416 to admit heated liquid 410 into the basket 110. The heated liquid may interact with the beverage grounds 414 creating a beverage medium. The beverage medium 414 may flow through the filter medium 130 and exit through an opening in the cartridge 400. Alternatively, no cover 200 may be required. In this case, the heated liquid 410 will flow directly into the basket 110.

Figure 5:
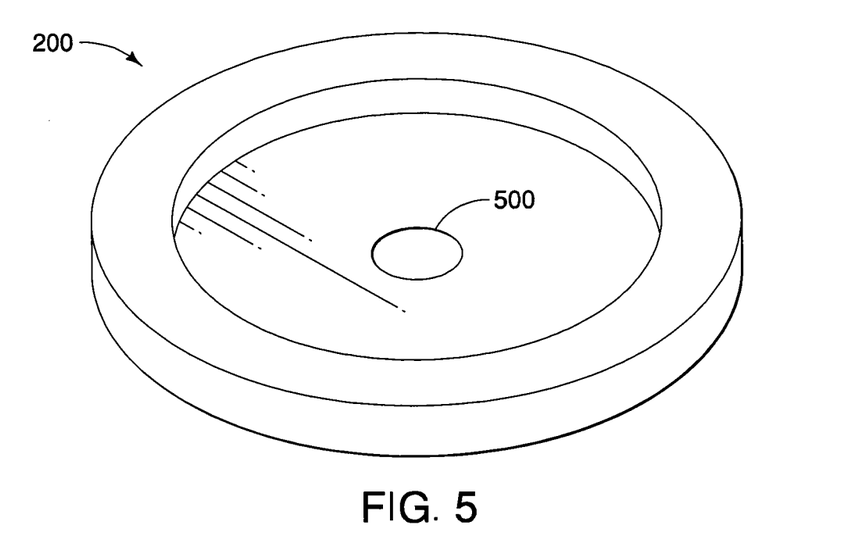
FIG. 5 illustrates an exemplary lid for a disposable beverage portion basket.

FIG. 5 illustrates one example of a lid 122 for a basket 110. The cover 200 of the lid 122 may include an opening 500 for entry of a liquid probe. The opening 500 may be a weakened portion of the material of the cover 200 which may give easily under the pressure of a probe.

Figure 6:
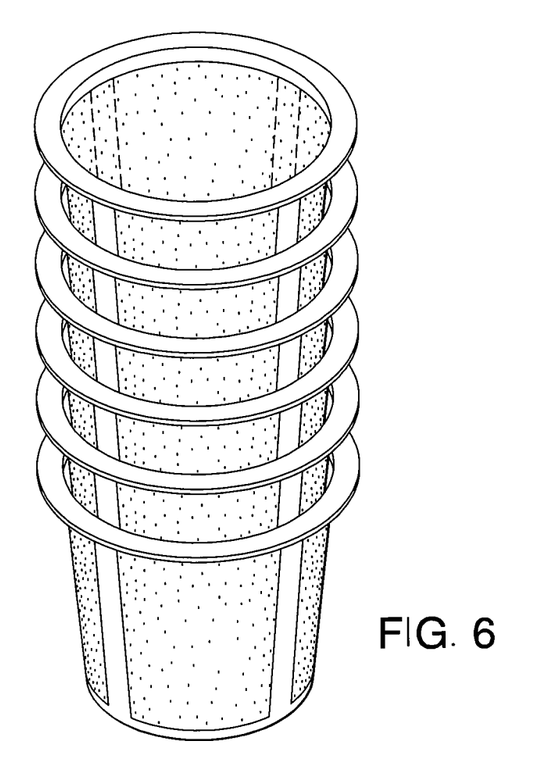
FIG. 6 illustrates an exemplary package of multiple disposable beverage portion baskets.

In FIG. 6, unloaded tapered baskets 110 may be configured for efficient nesting. The baskets 110 may be sold nested in a stack or tube, which may be packed in a sleeve of plastic film, or otherwise. The unloaded basket 110 may allow the end user to select a variety of beverage grounds 414 for use in their single serve brewer. The end user may also be able to modify the amount of beverage grounds 414 for use in their single serve brewer.

The components of the single use beverage package 100 may be selected with the intention of creating an environmentally friendly product. For example, the filter medium 130 may be made from a range of synthetic or biodegradable, recycled or recyclable, or compostable materials such as polyolefins, polylactic acid, cellulosics, polyhydroxyalkanoates, thermoplastic starch, a combination of these or other materials. The basket frame 128 material, cover 200 and barrier 112 may also be made out of these materials or similar synthetic, biodegradable, recycled or recyclable, or compostable materials which retain the properties of structural integrity (e.g., frame 128) and impermeability (e.g., barrier 112).

Figure 8A:
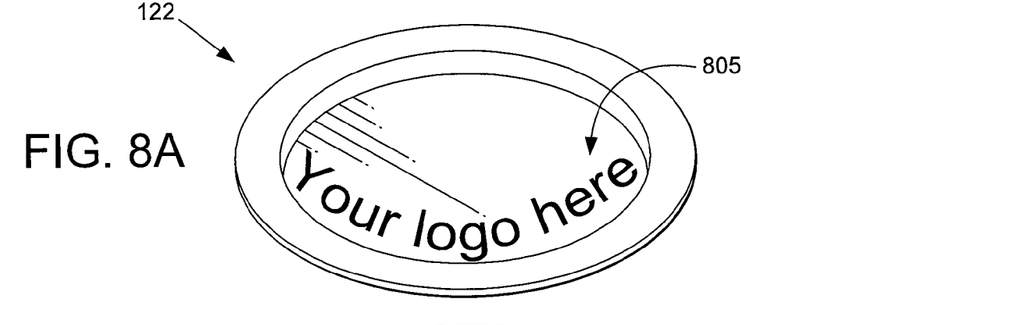
FIG. 8A illustrates the placement of a logo on the exemplary lid.
Figure 8B:
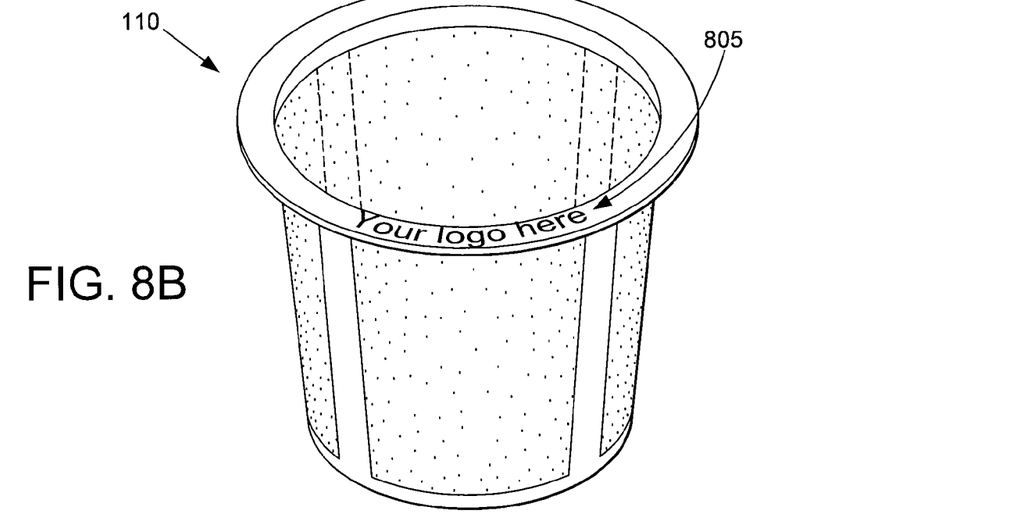
FIG. 8B illustrates the placement of a logo of the basket.
Figure 8C:
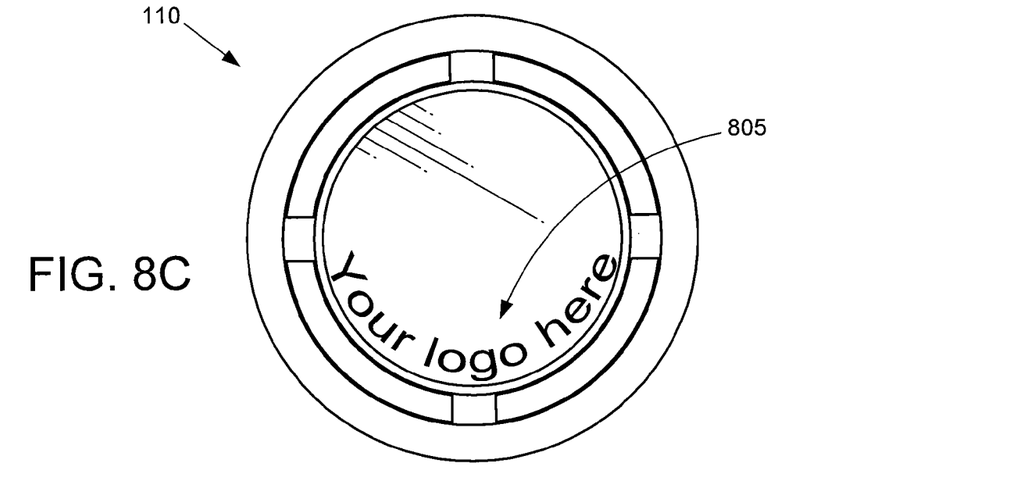
FIG. 8C illustrates the placement of a logo on underside of the basket.

While various embodiments of the embodiments have been described, it will be apparent to those of ordinary skill in the art that many more embodiments and implementations are possible that are within the scope of the claims. For example, referring to FIGS. 8A-8C, logos 805 of various configurations may be placed on the lid 122 (FIG. 9A), the basket 110 (FIG. 8B), or the underside of the basket 110. The logos 805 may also be printed on the filter medium 130. The logos 805 enable a vendor to, for example, place descriptive information about the product that is in the basket, such as whether the product is coffee or tea, a type of blend, and the like. Other information known to those skilled in the art may also be printed.

Accordingly, it will be apparent to those of ordinary skill in the art that many more embodiments and implementations are possible that are within the scope of the claims. Therefore, the embodiments described are only provided to aid in understanding the claims and do not limit the scope of the claims.

The invention claimed is:

1. A disposable single use beverage package for use in brewing a beverage from a beverage grounds, including:
  (a) a permeable cup-shaped basket having a tapered configuration and made of a recyclable or compostable material, the basket having a first end, a second end and a sidewall in between, the first end being open and defined by a circular top rim, the second end being closed and defined by a solid bottom portion, and the sidewall comprising a frame and a filter medium, the frame of said sidewall defined by a plurality of spaced apart ribs that extend upwardly from the bottom portion to the top rim and are integrally formed with the bottom portion and the top rim, the cup-shaped basket being structurally stable and rigid relative to the filter medium so as to provide structural integrity to the filter medium, wherein:
    (i) the frame and the top rim are made of a recyclable or compostable material, and the plurality of spaced apart ribs define a plurality of sidewall openings; and
    (ii) the filter medium comprising a liquid-permeable non-woven material that is flexible relative to the structurally stable and rigid cup-shaped basket and formed of interconnected fibers made of a same recyclable or compostable plastic material as the frame, the non-woven filter medium formed into a closed loop and having a tapered shape and comprising a structural component formed independent of the cup-shaped basket, wherein the plastic material of the frame, the circular bottom, the plurality of ribs, and the top rim, are thermally bonded into and around the fibers of the non-woven filter medium, whereby the non-woven filter medium is integrally formed into the frame and covers the plurality of side openings, the tapered shape of the non-woven filter medium defining a tapered shape of the cup-shaped basket;
  (b) an amount of beverage grounds, prefilled and disposed within the permeable basket;
  (c) a cover of film material selected from the group consisting of a foil, foil laminate, metalized coated film or multilayer laminate, EVOH film, polyethylene film, thermoplastic starch film, plastic film, and barrier plastic film, and laminates and composites thereof, that is attached to the opening at the top of the frame, to maintain beverage grounds within the basket, the cover forming a water-tight seal; and
  (d) a disposable impermeable barrier that contains and seals therewithin the permeable basket.

2. The disposable single use beverage package of claim 1, where the frame is made of polypropylene, and the non-woven filter medium is made of polypropylene.

3. The disposable single use beverage package of claim 1, where the frame is made of polylactic acid and the filter medium is made of polylactic acid.

4. The disposable single use beverage package of claim 1, where the recyclable or compostable permeable basket is a product made by an insert injection molding process by injecting the material of the frame around the filter medium.

5. The disposable single use beverage package of claim 1, where the disposable impermeable barrier is a tightly sealed wrap, bag or pouch.

6. The disposable single use beverage package of claim 1, where the disposable impermeable barrier comprises a material selected from the group consisting of foil laminate, metalized film, EVOH film, polyethylene, and other barrier plastic.

7. The disposable single use beverage package of claim 1, wherein the cover can be punctured to allow a liquid to enter into the basket.

8. The disposable single use beverage package of claim 1, where the beverage grounds are coffee grounds.

9. A recyclable or compostable single use permeable cup-shaped basket for use in brewing a beverage from a beverage grounds, the basket comprising; a frame, and a porous filter medium;
  a continuous, circular top rim that defines an opening at a top of the frame;
  a circular, closed bottom; and
  a plurality of spaced apart ribs that extend from the top rim to the closed bottom, wherein the closed bottom, the plurality of ribs, and the top rim define a plurality of side openings that facilitate fluid flow;
  wherein the porous filter medium comprises a non-woven filter medium that is formed of interconnected fibers made of a recyclable or compostable plastic material, the non-woven filter medium being separately formed from the same plastic material as the frame and formed into a closed loop and having a tapered shape, wherein the plastic material of the frame, the circular bottom, the plurality of ribs, and the top rim, are thermally bonded into and around the fibers of the non-woven filter medium, whereby the non-woven filter medium is integrally formed into the frame and covers the plurality of side openings, the tapered shape of the non-woven filter medium defining a tapered shape of the cup-shaped basket.

10. The disposable single use beverage package of claim 1, wherein the beverage grounds are tea grounds.

11. The recyclable or compostable single use permeable basket of claim 9, where the frame is made of polypropylene, and the non-woven filter medium is made of polypropylene.

12. The recyclable or compostable single use permeable basket of claim 9, where the frame is made of polylactic acid, and the non-woven filter medium is made of polylactic acid.

13. A disposable single use beverage package for use in brewing beverage grounds, including:
(a) a permeable cup-shaped basket having a tapered configuration and made of a recyclable or compostable material, the basket having a first end, a second end and a sidewall in between, the first end being open and defined by a circular top rim, the second end being closed and defined by a solid bottom portion, and the sidewall comprising a frame and a filter medium, the frame of said sidewall defined by a plurality of spaced apart ribs that extend upwardly from the bottom portion to the top rim and are integrally formed with the bottom portion and the top rim, the cup-shaped basket being structurally stable and rigid relative to the filter medium so as to provide structural integrity to the filter medium, wherein:
  (i) the frame and the top rim are made of a same recyclable or compostable plastic material, and the plurality of spaced apart ribs define a plurality of sidewall openings; and
  (ii) the filter medium comprises a liquid-permeable non-woven material that is flexible relative to the structurally stable and rigid cup-shaped basket and formed of interconnected fibers made of the same recyclable or compostable material as the frame, the filter medium being separately formed from the same plastic material as the frame and formed into a closed loop and having a tapered shape and consisting of a structural component formed independent of the cup-shaped basket, wherein the plastic material of the frame, the circular bottom, the plurality of ribs, and the top rim, are thermally bonded into and around the fibers of the non-woven filter medium, whereby the non-woven filter medium is integrally formed into the frame and covers the plurality of side openings, the tapered shape of the non-woven filter medium defining a tapered shape of the cup-shaped basket;
(b) an amount of a beverage grounds, prefilled and disposed within the permeable basket;
(c) a cover of film material selected from the group consisting of a foil, foil laminate, metalized film, coated film or multilayer laminate EVOH film, polyethylene film, thermoplastic starch film, plastic film, and barrier plastic film, and laminates and composites thereof, that is attached the top rim and across the opening at the top of the frame to maintain the beverage grounds within the basket, the cover forming a watertight seal; and
(d) a disposable impermeable barrier that contains and seals therewithin the permeable basket, the beverage grounds, and the cover.

14. The disposable single use beverage package of claim 13, where the circular bottom of the frame has one or more bottom openings, and non-woven filter medium is further bonded thermally to the circular bottom and covers the one or more bottom openings.

15. The disposable single use beverage package of claim 14, where the frame is made of polypropylene, and the non-woven filter medium material is made of polypropylene.

* * * * *

UNITED STATES PATENT AND TRADEMARK OFFICE
CERTIFICATE OF CORRECTION

Page 1 of 1

PATENT NO. : 9,527,661 B2
APPLICATION NO. : 12/889144
DATED : December 27, 2016
INVENTOR(S) : Thomas Z. Fu et al.

It is certified that error appears in the above-identified patent and that said Letters Patent is hereby corrected as shown below:

In the Claims

Claim 13, Column 8, Line 22:
"thereof, that is attached the top rim and across the"
Should read:
--thereof, that is attached to the top rim and across the--.

Signed and Sealed this
Sixth Day of June, 2017

Michelle K. Lee
*Director of the United States Patent and Trademark Office*